United States Patent [19]

Kirchberger et al.

[11] Patent Number: 4,863,322

[45] Date of Patent: Sep. 5, 1989

[54] CLAMPING DEVICE FOR FISING A DISKLIKE ROTARY CUTTER TO A TOOLHOLDER

[75] Inventors: Peter Kirchberger, Haag; Gottfried Blaimschein, Steyr, both of Austria

[73] Assignee: GFM Gesellschaft für Fertigungstechnik und Maschinenbau Gesellschaft m.b.H., Steyr, Austria

[21] Appl. No.: 201,553

[22] Filed: Jun. 2, 1988

[30] Foreign Application Priority Data

Jun. 11, 1987 [EP] European Pat. Off. ........ 87890130.5

[51] Int. Cl.[4] .......................... B23C 5/26; B24B 41/00
[52] U.S. Cl. ....................................... 409/232; 51/168
[58] Field of Search ................ 409/232, 233, 234; 279/2 R; 403/369, 370, 371; 51/168, 206 R; 408/231, 239 R, 239 A

[56] References Cited

U.S. PATENT DOCUMENTS

| | | | |
|---|---|---|---|
| 1,472,565 | 10/1923 | Manning | 279/1 R |
| 1,797,296 | 3/1931 | Ray | 409/234 X |
| 2,912,904 | 11/1959 | Peterson | 409/234 X |
| 3,646,711 | 3/1972 | Olshi et al. | 51/168 |
| 3,764,224 | 10/1973 | Merz | 408/231 |
| 4,053,244 | 10/1977 | Dively | 403/370 X |
| 4,061,076 | 12/1977 | Robertson | 409/232 |
| 4,108,259 | 8/1978 | Dixon et al. | 403/369 X |
| 4,701,084 | 10/1987 | Ide | 409/234 X |

FOREIGN PATENT DOCUMENTS

| | | | |
|---|---|---|---|
| 10208786 | 12/1985 | European Pat. Off. | 409/234 |
| 241011 | 10/1986 | Japan | 409/234 |
| 1313590 | 5/1987 | U.S.S.R. | 409/232 |

Primary Examiner—William Briggs
Attorney, Agent, or Firm—Kurt Kelman

[57] ABSTRACT

A clamping device (5) is provided, which serves to fix a rotarty cutter (3, 3a) to a toolholder (2, 2a). The rotary cutter (3, 3a) has a planar radial contacting surface (15, 15a) for engaging a planar radial end face (16, 16a) of the toolholder. Load-applying means (7, 8a) are provided for forcing the rotary cutter by means of a conical interface (13) against the toolholder (2). In order to provide a simple clamping device by which the rotary cutter is secured to the toolholder exactly in a desired position, the load-applying means (7, 7a) engage clamping means (6, 6a), which define the conical interface (13) with the rotary cutter (3, 3a) and which are supported on the toolholder (2, 2a) at a cylinder interface (14) and are elastically deformed by the load-applying means.

8 Claims, 2 Drawing Sheets

CLAMPING DEVICE FOR FISING A DISKLIKE ROTARY CUTTER TO A TOOLHOLDER

BACKGROUND OF THE INVENTION

1. Field of the Invention

This invention relates to a clamping device for fixing a disklike rotary cutter to a rotatable toolholder, which is adapted to be driven, specifically to such a device for clamping a rotary cutter having a planar contact surface which is associated with a planar end face of the toolholder, wherein the rotary cutter is adapted to be clamped against the toolholder by means of axially acting load-applying means and clamping means which are formed with a conical seating surface for engaging the rotary cutter and with a cylindrical seating surface for engaging the toolholder with elastic deformation.

2. Description of the Prior Art

Rotary cutters of machine tools, such has externally or internally cutting milling wheels or grinding disks, cannot machine a workpiece with the required precision unless they are radially and axially aligned with respect to the toolholder, which may consist of a driving spindle or a toolholding drum. For that reason the means for clamping the rotary cutter are required also to determining a proper position for the rotary cutter. From U.S. Pat. No. 1,472,565 and EP-A No. 1 0 208 786 it is already known that an axial and radial alignment of the cutter can be ensured in that the rotary cutter is not fixed directly to the toolholder but is indirectly fixed thereto by means of separate clamping elements, which permit an adjustment of the rotary cutter in radial and axial directions without a backlash. Because the clamping elements have a cylindrical seating surface, they can axially be adjusted relative to the toolholder so that the axial clamping by the axial component of force which is due to the conical seating surface causes the contacting surface of the rotary cutter to bear on the associated end face of the toolholder and to be exactly axially aligned. After that axial alignment the axial clamping which is effected by the radial component of force that is due to the conical seating interface ensures that the rotary cutter will properly be centered and, owing to the contact between the contacting surface of the rotary cutter and the end face of the toolholder, the clamping element will be subjected to an elastic deformation at the cylindrical seating interface so that there is no backlash at the cylindrical seating interface between the clamping element and the toolholder and the rotary cutter is exactly radially aligned. The purely axial clamping action of the clamping element and the fact that it is capable of elastic deformation - this can be ensured by a proper selection of the material and/or design of the clamping element - will ensure that the rotary cutter can be adjusted and fixed with very high accuracy. But in the previous practice it is necessary to remove all clamping elements and load-applying members when the rotary cutters are to be removed from and mounted on the toolholder so that a change of the rotary cutter will involve rather difficult and time-consuming work. Besides, the known clamping device can be used only with toolholding spindles.

SUMMARY OF THE INVENTION

It is an object of the invention to eliminate the disadvantages outlined hereinbefore and to provide a clamping device which is of the kind described first hereinbefore and can be used with toolholding spindles and toolholding drums and which ensures that the rotary cutter will be fixed to the toolholder in exact radial and axial alignment. Besides, the clamping device should be operable in a simple and convenient manner.

That object is accomplished in accordance with the invention in that the clamping element consists of a clamping ring, the clamping ring and the rotary cutter are provided at their periphery with regularly peripherally spaced apart claws, which have back surfaces forming the conical seating surface, and spaces which are wider than the claws are defined between adjacent claws. When the claws of the clamping ring and those of the rotary cutter register with each other, the clamping ring will perfectly be able to perform its adjusting function. On the other hand, when the clamping ring and the rotary cutter have been rotated relative to each other so that their claws are staggered, the clamping ring will release the rotary cutter so that the latter can be pulled from the spindle without a need for a removal of the clamping ring. This is possible because the claws of one member can move through the spaces between the claws of the other member. For a mounting of the rotary cutter said operations are performed in the reverse sequence in that the rotary cutter is fitted on the toolholder and the clamping ring is subsequently rotated and axially loaded. In that manner the rotary cutter can be changed quickly and easily and the need for loose fixing parts is eliminated.

In a preferred embodiment the invention is applied to a clamping device for fixing an externally cutting rotary cutter to a toolholding drive spindle. In that case the load-applying means comprise a load-applying flange, which engages an end face of the clamping ring and comprises a protruding hub portion, which extends into the hollow spindle and cooperates with a preferably spring-loaded load-applying bolt, the protruding hub portion is formed with a helical guide groove, which merges into an axial groove end portion, and the spindle is provided with a radial follower pin extending into said groove. In that embodiment the load-applying means thus comprise a desirable load-applying member, which permits the application of a clamping load to the rotary cutter from that portion of the spindle which is remote from the rotary cutter. The load-applying flange is pulled against the clamping ring by the spindle and this is accomplished by means of a simple load-applying bolt, which is adapted to be screwed relative to the spindle or may desirably be biased by suitable load-applying springs so that the clamping load will automatically be applied and the rotary cutter may be released merely in that the load-applying bolt is pushed against the spring bias. In that case the axial movement imparted to the protruding hub portion by means of the load-applying bolt will not only result in a relief from the clmaping load but owing to the cooperation between the follower pin and the guiding groove will impart to the clamping ring the angular movement that is required for a release of the rotary cutter.

To provide a functional unit comprising the load-applying flange and the clamping ring whereas the compensating movements to be performed by the clamping ring for the adjustment will not be interfered with, it is possible within the scope of the invention to couple the load-applying flange and the clamping ring to each other with a backlash in the peripheral direction.

For a clamping of internally cutting rotary cutters to a toolholding drum, the invention may be applied to an embodiment in which the clamping means do not consist of an integral clamping ring but of at least two and preferably four clamping keys, which have radially outwardly facing surfaces forming the cylindrical seating surface and have radially inwardly facing surfaces forming the conical seating surface. Said keys may be axially loaded, e.g., by loadapplying bolts, so that an exact adjustment and a backlashfree seating of the rotary cutter can also be effected in a rather simple manner. In that case too the fixation will be effected in the peripheral rather than in the axial region and a centering will be effected by means of radially inwardly directed components of force.

The clamping keys may be formed with transverse slots in order to facilitate the elastic deformation of the keys regardless of their material.

DETAILED DESCRIPTION OF THE PREFERRED EMBODIMENTS

Illustrative embodiments of the invention will now be described more in detail with reference to the accompanying diagrammatic drawings.

Figure 1:
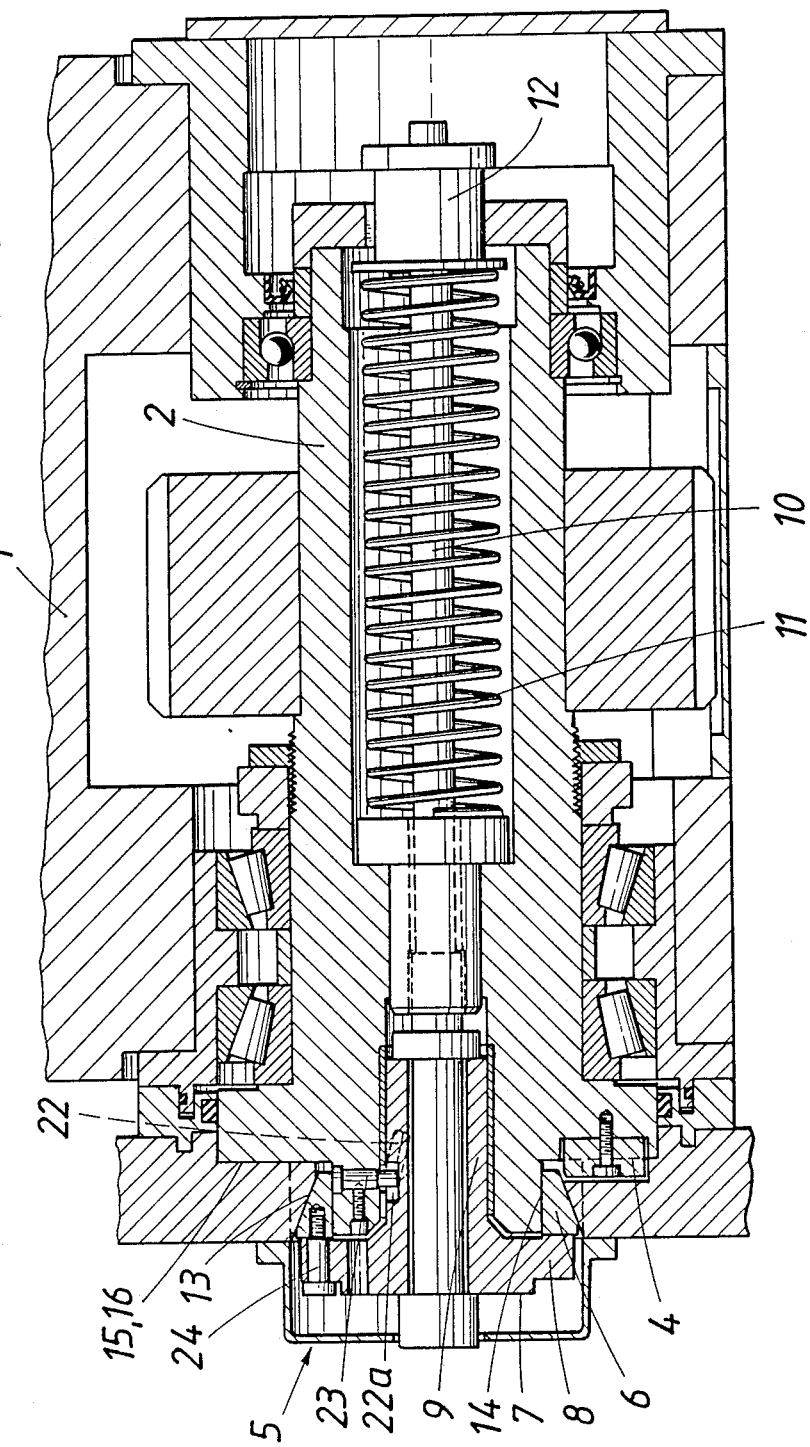
FIG. 1 is an axial sectional view showing a clamping device in accordance with the invention.
Figure 2:
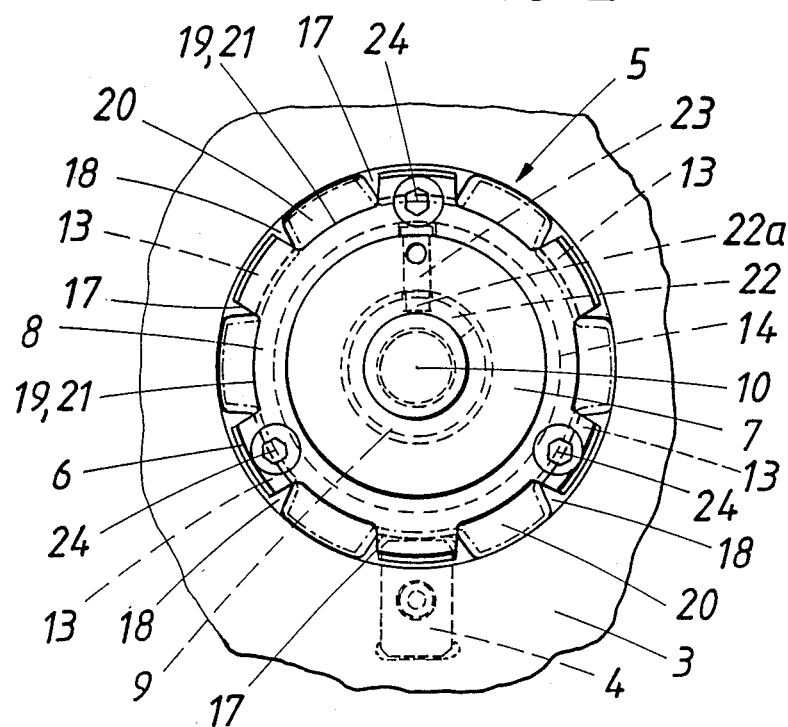
FIG. 2 is an enlarged and view showing that clamping device when the cover has been removed.

In the embodiment shown in FIGS. 1 and 2 an externally cutting inserted-tooth cutter 3 is mounted on and engages the end face of a drive spindle 2, which is rotatably mounted in a housing 1 and adapted to be driven. A coupling key 4 is provided for non-rotatably connecting the inserted-tooth cutter 3 to the spindle 2. The inserted-tooth cutter 3 is adjusted relative to the spindle 2 and fixed to the spindle in the proper position by means of a clamping device 5, which comprises a clamping ring 6 and an axially acting load-applying member 7. The load-applying member 7 consists of a load-applying flange 8, which engages an end face of the clamping ring 6, and has a protruding hub portion 9, which protrudes into the tubular spindle 2. The protruding hub portion 9 cooperates with a load-applying bolt 10, which is biased in the load-applying sense by a load-applying spring 11. The load-applying bolt 10 is mounted to be rotatable relative to the protruding hub portion 9 and is held against a displacement relative to said protruding hub portion. At that end of the spindle 2 which is remote from the inserted-tooth cutter 3 the load-applying bolt 10 carries an actuating head 12, by which the bolt 10 can axially be displaced against the force of the load-applying spring 11.

The clamping ring 6 fits the inserted-tooth cutter 3 at a conical seating interface 13 and is mounted on the spindle 2 by a cylindrical seating interface 14. The clamping ring 6 is elastically deformable so that the inserted-tooth cutter 3, the spindle 2 and the clamping ring 6 can cooperate with each other without a backlash. When an axial clamping force for clamping the inserted-tooth cutter 3 is exerted on the clamping ring 6 by means of the load-applying flange 7, the clamping ring 6 and the inserted-tooth cutter 3 coupled thereto will move relative to the spindle 2 in the direction of the force applied until a planar contacting surface 15 of the inserted-tooth cutter 3 engages an associated planar end face 16 of the spindle so that the inserted-tooth cutter 3 is exactly positioned in an axial direction. Owing to the conical seating interface 13 the axial clamping force which is exerted effects a centering and a radial alignment of the inserted-tooth cutter 3 and the clamping ring 6 is elastically performed at the same time so that there will be no backlash at the cylindrical seating interface 14 between the clamping ring 6 and the spindle 2. As a result, the axially directed loading force will ensure a perfectly exact radial and aixal alignment of the inserted-tooth cutter 3 relative to the spindle 2.

As is particularly apparent from FIG. 2 the clamping ring 6 and the inserted-tooth cutter 3 are provided each with an annular set of claws 17, 18, which have a univorm angular spacing and have back surfaces which form the conical seating interface 13 and space 19, 20 which are wider than the claws are provided between adjacent claws of each set thereof. The load-applying flange 8 is formed with recesses 21, which register with the spaces 19, 20. The protruding hub portion 9 of the load-applying flange 8 is formed with a helical guide groove 22, which merges into an axial groove end portion 22a. The spindle 2 is provided with a radially extending guide pin 23, which extends into said groove. The clamping ring 6 and the load-applying flange 8 are loosely coupled to form a functional unit by suitable screws 24 which permit of a radial backlash. As a result, the clamping device 5 can conveniently be opened or closed by an actuation of the actuating head 12 of the load-applying bolt 10. If the load-applying bolt 10 is axially advanced in the opening sense, against the force of the clamping spring 11, the cooperation of the guide groove 22, 22a and the follower pin 23 will cause the functional unit consisting of the load-applying flange 8 and the clamping ring 6 first to perform a rearward movement and thereafter to rotate relative to the spindle 2. As a result, the clamping ring 6 will be relieved from the load and will be disengaged from and rotated relative to the inserted-tooth cutter 3. In addition to being relieved from the load, the inserted-tooth cutter 3 is released because the clamping ring 6 has been rotated to a position in which its claws 17 register with the spaces 19 between the claws 18 of the inserted-tooth cutter rather than with said claws 18, as is indicated in phantom. The inserted-tooth cutter 3 can now be pulled from the spindle 2 over the clamping ring 6 and the load-applying flange 8. For a mounting of the inserted-tooth cutter 3 on the spindle 2 the above-described operations are performed in a reverse sequence after the clamping ring 6 has been rotated to a proper position. The inserted-tooth cutter 3 is pushed onto the spindle 2 in an angular position in which the coupling key 4 is effective. Thereafter the load-applying spring 11 is permitted to impart via the load-applying bolt 10 a rearward axial movement to the functional unit consisting of the load-applying flange 8 and the clamping ring 6. This will also result in an angular movement of the clamping ring 6 so that the cooperation of the claws 17, 18 of the clamping ring 6 and the inserted-tooth cutter 3 is re-established. Now the conical seating interface 13 and the cylindrical seating interface 14 are fully effective so that the inserted-tooth cutter 3 is clamped in an exactly adjusted position.

Figure 3:
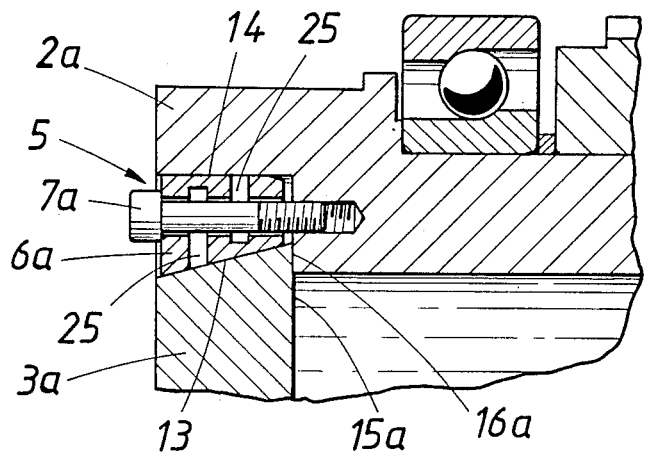
FIG. 3 is an axial sectional view showing a modification of the clamping device of FIG. 1.

In the embodiment shown in FIG. 3 a similar adjustment and clamping can be achieved for an internally cutting inserted-tooth cutter 3a, which is mounted in a rotary toolholding drum 2a, which is adapted to be driven. In that case the clamping means comprise clamping keys 6a, which have radially outwardly facing surfaces which cooperate with an inside surface of the drum 2a to form a cylindrical seating interface 14 and have radially inwardly facing surfaces which cooperate with an outside surface of the inserted-tooth cutter 3a to constitute a conical seating interface 13. Said clamping keys 6a may be subjected to an axial load by load-applying screws 7a or by spring-loaded load-applying bolts, not shown, so that the inserted-tooth cutter 3a will be axially aligned as its contacting surface 15a engages the associated end face 16a of the drum, and will be radially aligned owing to the conical seating interface 13 and the backlashfree support at the cylindrical seating interface 14. The clamping keys 6a are formed with transverse slots 25 to facilitate the axial deformation of the clamping keys 6a, which are supported without backlash on the toolholding drum 2a.

We claim:

1. In a clamping device for fixing a disklike rotary cutter to a rotatably drivable toolholder consisting of a tubular spindle having a planar radial end face and a first cylindrical surface, said rotary cutter having a first conical surface and a planar radial contacting surface which is engageable with said end face of said toolholder,
    wherein said clamping device has a second conical surface adapted to define a concial interface with said first conical surface and said clamping device comprises load-applying means for axially forcing said contacting face against said end face while said first and second concial surfaces contact each other,
    the improvement residing in that
    said clamping device coprises elastically deformable clamping means formed with said second conical surface, the clamping means comprising a clamping ring formed with a second cylindrical surface adapted to form a cylindrical interface with said first cylindrical surface, and
    said load-applying means are operable to axially force said rotary cutter by said clamping means against said toolholder so that said contacting face engages said end face, said first and second conical surfaces contact each other, said first and second cylindrical surfaces contact each other, and said clamping means are elastically deformed, said load-applying means comprising a load-applying bolt, which extends axially into said tubular spindle, and a load-applying flange, which has a protruding hub portion that extends axially into said tubular spindle around and is operatively connected to said load-applying bolt, and said clamping ring is axially engageable by said load-applying flange.

2. In a rotary cutter assembly comprising
    a disklike rotary cutter having a first conical surface and a planar radial contacting surface, and
    a clamping device for fixing said rotary cutter to a rotatably drivable toolholder consisting of a tubular spindle having a first cylindrical surface and a planar radial end face which is engageable by said contacting surface,
    wherein said clamping device has a second conical surface defining a conical interface with said first conical surface and said clamping device comprises load-applying means for axially forcing said contacting face against said end face while said first and second conical surfaces contact each other,
    the improvement residing in that
    said clamping device comprises elastically deformable clamping means formed with said second conical surface, the clamping means comprising a clamping ring formed with a second cylindrical surface that is adapted to form a cylindrical interface with said first cylindrical surface, and
    said load-applying means are operable to axially force said rotary cutter by said clamping means against said toolholder so that said contacting face engages said end face, said first and second conical surfaces contact each other, said first and second cylindrical surfaces contact each other, and said clamping means are elastically deformed, said load-applying means comprising a load-applying bolt, which extends axially into said tubular spindle, and a load-applying flange, which has a protruding hub portion that extends axially into said tubular spindle around and is operatively connected to said load-applying bolt, and said clamping ring is axially engageable by said load-applying flange.

3. The improvement sete forth in claim 1, wherein said load-applying bolt is spring-loaded in an axial direction to urge said load-applying flange against said clamping ring.

4. The improvement set forth in claim 1, wherein said clamping device for fixing said rotary cutter to a tubular spindle has a bore and a follower pin extending radially into said bore, and wherein
    said protruding hub portion is formed on its outside surface with a groove having a helical portion and an axial end portion and adapted to receive and cooperate with said pin.

5. The improvement set forth in claim 1, wherein said load-applying flange and said clamping ring are interconnected by means which provide a radial backlash between said load-applying flange and said clamping ring.

6. The improvement set forth in claim 2, wherein
    said rotary cutter is provided at its periphery with a first set of claws having a uniform angular spacing,
    said clamping ring is provided at its periphery with a second annular set of claws having a uniform angular spacing,
    the claws of each of said sets define spaces between them which are wider than said claws,
    the claws of said first set have radially inwardly facing surfaces forming said first conical surface and
    the claws of said second set have radially outwardly facing surfaces forming said second conical surface.

7. The improvement set forth in claim 6, wherein said load-applying bolt is spring-loaded in an axial direction to urge said load-applying flange against said clamping ring.

8. The improvement set forth in claim 6, wherein said tubular spindle has a bore and a follower pin extending radially into said bore, and wherein
    said protruding hub portion is formed on its outside surface with a groove having a helical portion and an axial end portion and adapted to receive and cooperate with said pin.

* * * * *

UNITED STATES PATENT OFFICE
CERTIFICATE OF CORRECTION

Patent No. 4,863,322          Dated September 5, 1989

Inventor(s) Peter KIRCHBERGER and Gottfried BLAIMSCHEIN

It is certified that error appears in the above-identified patent and that said Letters Patent is hereby corrected as shown below:

Cover page, column 1, item [54], line 1, delete "FISING" and substitute therefor --FIXING--.

Signed and Sealed this

Second Day of October, 1990

*Attest:*

HARRY F. MANBECK, JR.

*Attesting Officer*      *Commissioner of Patents and Trademarks*